March 28, 1939.  F. G. WOOLLARD  2,152,370
HAND STEERING WHEEL
Filed Sept. 7, 1937   3 Sheets-Sheet 2
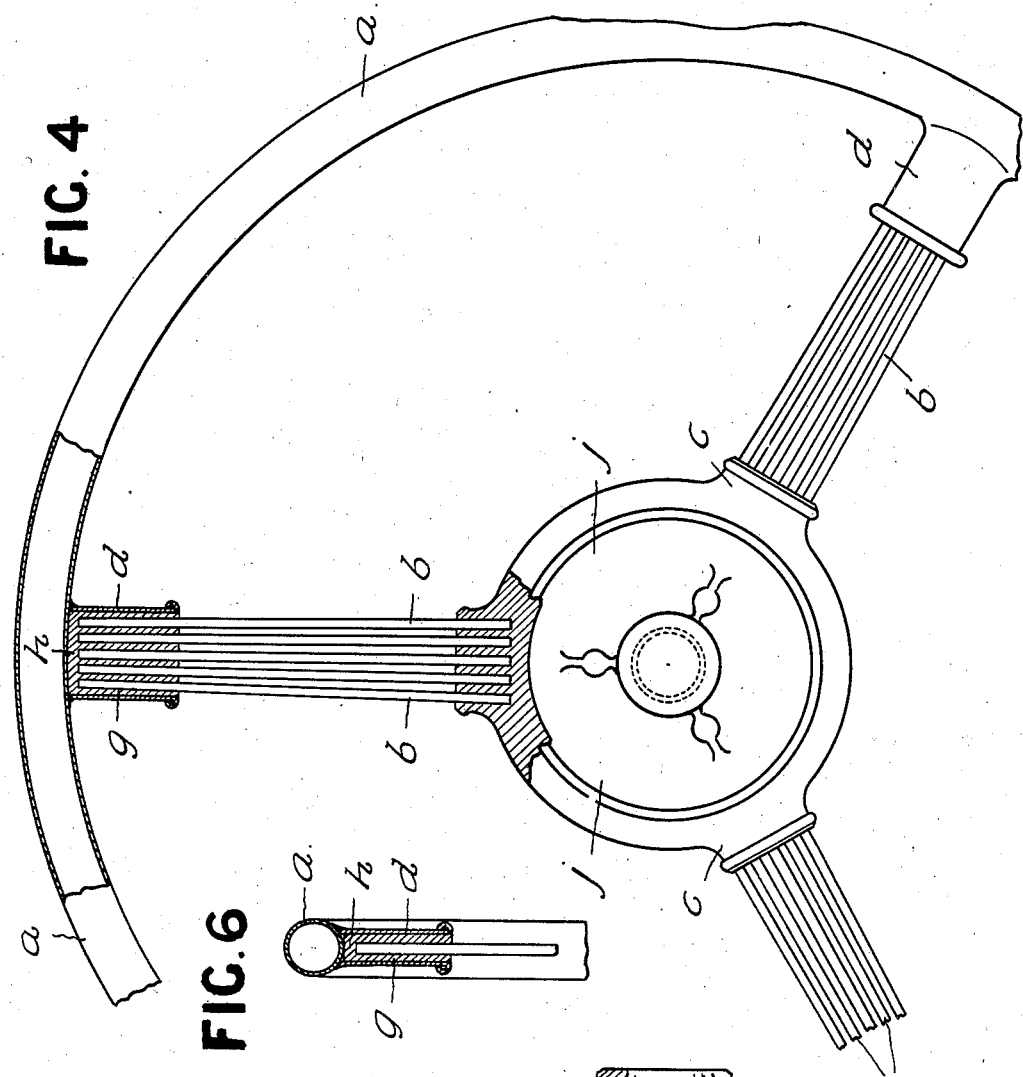
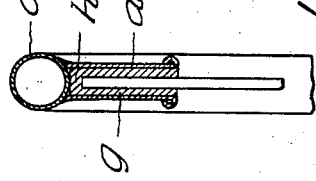
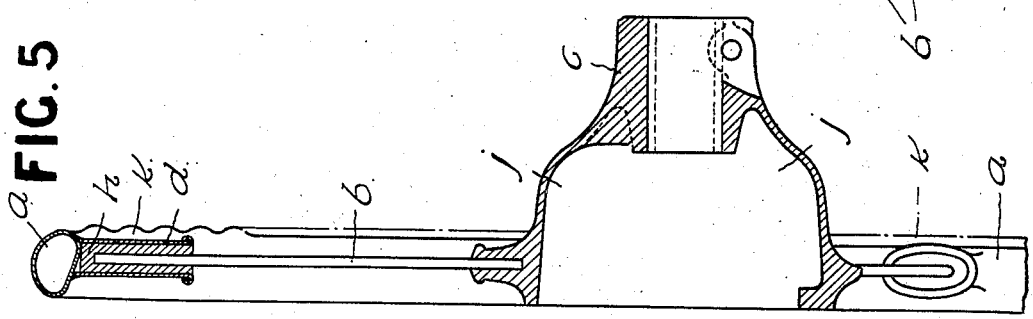
INVENTOR.
FRANK GEORGE WOOLLARD
BY
McConkey Dawson & Booth
ATTORNEYS.

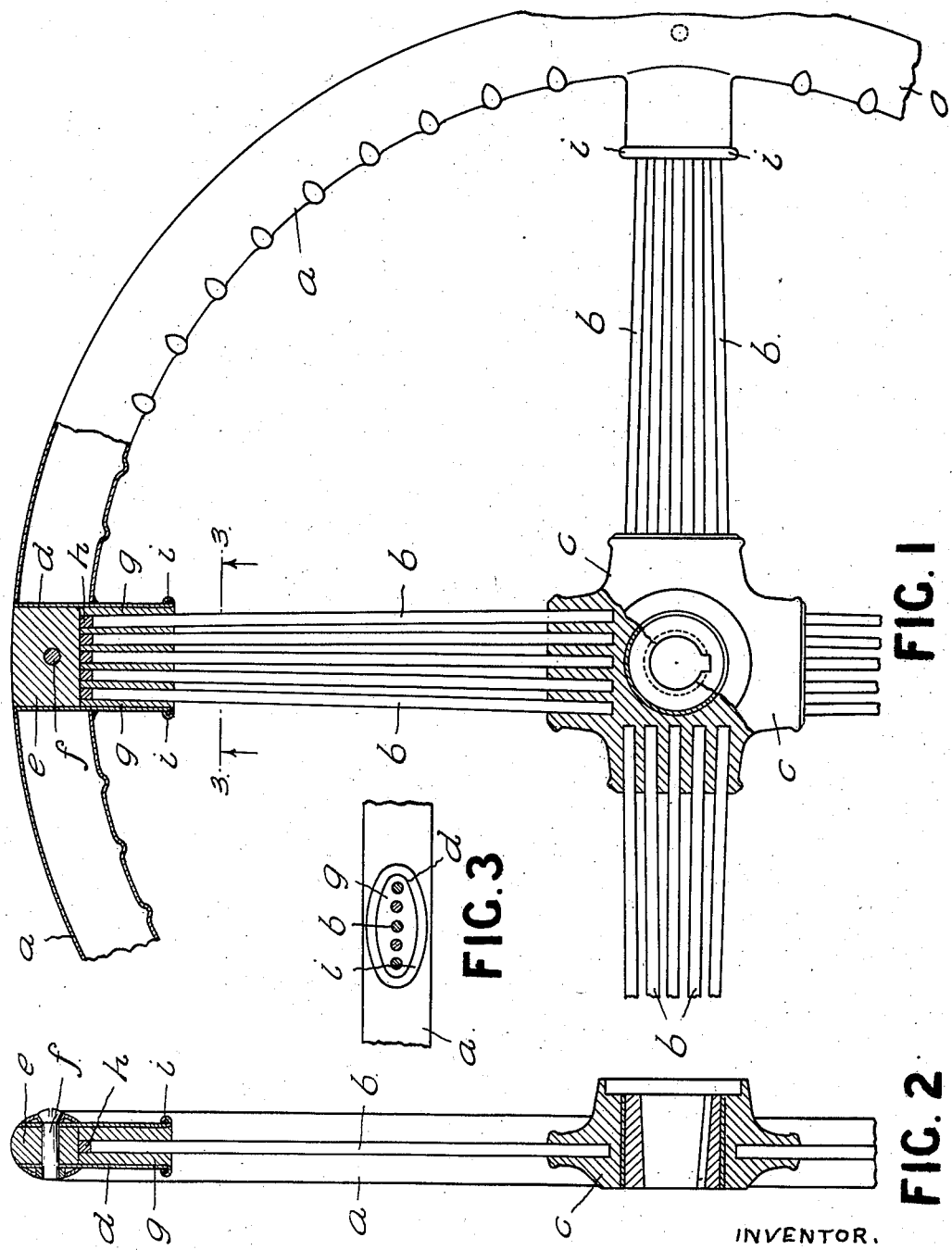

March 28, 1939.  F. G. WOOLLARD  2,152,370
HAND STEERING WHEEL
Filed Sept. 7, 1937   3 Sheets-Sheet 3
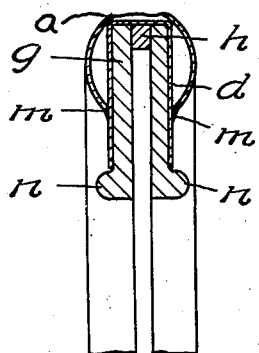
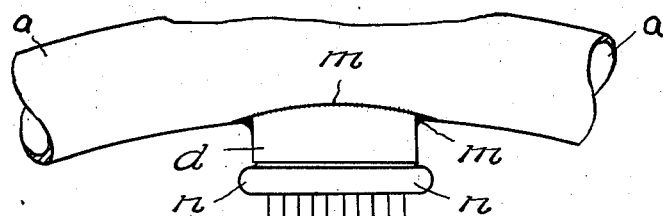
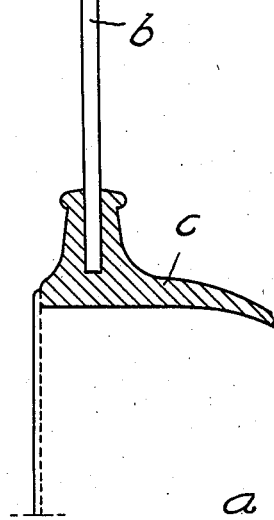
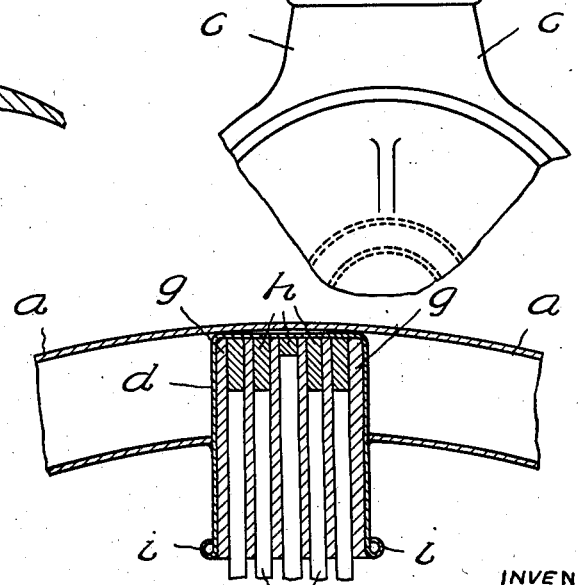
FIG. 8  FIG. 7
FIG. 9
INVENTOR
FRANK GEORGE WOOLLARD
BY
McConkey Dawson & Booth
ATTORNEYS.

Patented Mar. 28, 1939

2,152,370

UNITED STATES PATENT OFFICE 2,152,370

HAND STEERING WHEEL

Frank George Woollard, Smethwick, near Birmingham, England, assignor to The Birmingham Aluminum Casting (1903) Company Limited, Smethwick, near Birmingham, England, a British company Application September 7, 1937, Serial No. 162,591
In Great Britain November 30, 1936

15 Claims. (Cl. 74—552)

The invention relates to hand steering wheels of the kind in which a degree of resilience is imparted to the wheel by the use of spokes built up of a number of resilient metal wires anchored in a central boss.

In accordance with the present invention I provide for end movement of the component spoke wires with respect to the rim against resilient cushioning means so that when any displacement of the rim takes place, the wires instead of being unequally stressed are free to slide individually with respect to the rim. It is preferred to arrange for them to slide in a flexible or resilient substance disposed between the wires and the housing part on or in the rim for receiving each set of spoke wires. By this means a degree of resiliently cushioned, free end movement is allowed; and in the preferred arrangement a little movement in all directions is permitted against a resilient mounting, and noise, such as the creaking noise due to the contact of metal parts whilst they are under stress, will be eliminated.

The construction of the rim and the housing part thereon for the ends of the wires may be carried out in various ways. For example I may make a hollow, flattened, lug which is appropriately shaped at one end for seating against and being welded on to the inner face of, or partly within a hollow wheel rim with the major cross sectional dimension of the lug circumferentially directed. But obviously the rim might be cast with the lugs integral with it; or it might be cast in circumferential halves each part complete with half lugs and the parts be assembled and secured together.

For each spoke end I provide a rubber block having a body capable of fitting within the lug and form or mould a series of holes through it. These holes may be plugged at the ends remote from the wheel boss with rubber and vulcanised.

One of the rubber blocks is then fixed in each lug. The ends of the wires of an arm or spoke are inserted in the holes in the rubber block and the wires are suitably clamped in the desired spaced relation to each other ready for casting a boss of aluminium or other suitable metal in a die or mould on to their inner ends which are preferably enlarged, cranked or otherwise adapted for improving their anchorage in the cast boss.

The rubber plugs in the holes in the rubber blocks form cushions between the ends of the spoke wires and the bottom of the lug or the wall of the rim as the case may be so as to accommodate any differences in end movement occurring when spoke wires of equal length are differently stressed.

Different embodiments of this example of construction are illustrated in the appended drawings—

Figure 1 is a sectional plan of part of a steering wheel.

Figure 2 is a vertical sectional view.

Figure 3 is a cross section on one arm or spoke on line 3—3 of Figure 1.

Figures 4 and 5 are similar views to 1 and 2 showing a modification.

Figure 6 is a detail section with an alternative cross section of rim.

Figure 7 is a fragmentary plan of a steering wheel, and

Figure 8 is a partial vertical section illustrating another modification.

Figure 9 is a fragmentary sectional view illustrating a further slight modification.

In the example shown in Figures 1, 2 and 3 $a$ is the steering wheel rim, $b$ represents a spoke or arm of the wheel and $c$ is the attachment boss. Each spoke $b$ is formed of a number of steel or other resilient wires which may be substantially parallel or may diverge slightly as they approach the hub or boss $c$ of the wheel in which their inner ends are rigidly anchored.

Where each spoke $b$ meets the rim $a$ a hollow, flattened metal sleeve $d$ is secured to the rim to form an attachment lug or socket for the spoke. Here, the sleeve is shown inserted through a hole in the rim and welded to the walls thereof, its outer end being closed by a solid plug $e$ through which a screw bolt $f$ is passed, see Figure 2. The rubber block fitting within the sleeve $d$ and around the ends of the spoke wires is indicated by $g$ and $h$ are the cushioning plugs secured within the holes which are moulded in this block $g$ to receive the spokes. It is more convenient to core the holes through the block $g$ and plug them at the outer ends with rubber of suitable resiliency for cushioning the spoke ends. The plugs $h$ can be vulcanised in place. The inner end of the sleeve $d$ forming the attachment lug may be rolled over as shown at $i$ or may have a D-section ring welded on the outside to give a finish; or the rubber block may have a finishing bead outside the sleeve as in Figure 8.

The component wires of the spoke are clamped in the desired spaced relationship and the aluminium or like boss $c$ is cast thereon preferably in a die. The inner ends of the spokes may be deformed, or headed in any suitable manner to make the keying in the boss more effective.

In Figures 4, 5 and 6 the sleeves $d$ forming the attachment lugs for the spoke ends $b$ on the rim $a$ are welded to the inside wall of the rim and are not let into the rim. The rubber block $g$ has an end wall $h$ in one piece with it and a central boss $c$ of the kind in which a recess $j$ for containing certain controls or connections is shown in use. Different sections of rims are shown in Figures 5 and 6 and, as illustrated at $k$ in Figure 5, any desired shaping of the rim for improving the grip may be provided in the ordinary way.

In Figures 7 and 8 the metal sleeve $d$ has a blind outer end and is let into the tubular rim $a$ until this end abuts against the outer wall thereof. It is welded to the inner wall at $m$. The rubber block $g$ in which the outer ends of the spoke wires are received has plugs $h$ vulcanised in place as described with reference to Figures 1 to 3, and has a terminal bead $n$ moulded on it to lie outside the sleeve $d$.

As the rubber blocks $g$ have end walls or plugs $h$ moulded or vulcanised in place, they cannot creep along the spoke wires and attachment of the block in the sleeve other than a forcible fit is unnecessary; but if desired the blocks can be secured by suitable rubber cements or solution in the sleeves.

I may arrange that the central wire of each set of wires forming a spoke $b$ may have a positive radial abutment with the rim of the wheel or a part rigid therewith such as the metal plug $e$ Figures 1 and 2, and the other wires may be made shorter and arranged so as to be free to slide against the cushioning means. I may, however, provide a slightly resilient pad for a longer central wire to bear against and provide thicker and more resilient portions for shorter wires on each side of it as shown in Figure 9 thus permitting a slight end movement to the central wire and greater degrees of end movement to the other wires.

I claim:

1. A steering wheel having a rim, a central attachment boss, a number of spokes each built up of a number of resilient wires anchored in the boss, and means for attaching the resilient wires to the rim so as to allow them end movement with respect to the rim, said means comprising a metal sleeve for each spoke secured to the rim, and a rubber block having bores for the wires fitted in the sleeve.

2. A steering wheel having a rim, an attachment boss, a number of spokes each built up of a number of resilient wires anchored in the boss, and means for attaching the wires of the spokes to the rim comprising a block of rubber for each spoke with bores therein so that it shall receive and surround the end portions of the wires of the spoke, said block being mounted in the said attaching means and having resilient means for allowing endwise movement of the wires.

3. A steering wheel having a rim, an attachment boss, a number of spokes each built up of a number of resilient wires anchored in the boss, and means for attaching the wires of the spokes to the rim comprising a block of rubber for each spoke with bores therein so that it shall receive and surround the end portions of the wires of the spoke, said block being mounted in the said attaching means and having resilient rubber pads for allowing endwise movement of the wires.

4. A steering wheel having a rim, an attachment boss, a number of spokes built up of a number of resilient wires anchored in the boss, and means for attaching the wires of the spokes to the rim comprising a block of rubber for each spoke with bores therein so that it shall receive and surround the end portions of the wires of the spoke, said block being mounted in the said attaching means and having resilient rubber pads formed integral with said rubber block abutting the ends of the wires.

5. A steering wheel having a rim, an attachment boss, a number of spokes built up of a number of resilient wires anchored in the boss, means for attaching the wires of the spokes to the rim which allow for end movement of the wires of the spokes with respect to the rim, and resilient cushioning means in the form of a rubber block fitting around the ends of the wires of each spoke within said attaching means.

6. A steering wheel comprising in combination a rim, a number of arms or spokes built up of a number of resilient metal members, an attachment boss for the wheel in which the spoke members are anchored by casting said boss on to the ends of said members while they are held in the desired spaced relation, means for attaching the metal members of each spoke to the rim in a manner allowing end movement to them with respect to the rim when any displacement of the rim takes place and resilient cushioning means in the form of a rubber block arranged within the attaching means of each spoke said block surrounding each individual wire of the spoke.

7. A steering wheel having a rim, an attachment boss, a number of spokes built up of a number of resilient wires anchored in the boss, means for attaching the wires of the spokes to the rim which allow for end movement of the wires of the spokes with respect to the rim, and resilient cushioning means in the form of a rubber block fitting around the ends of the wires of each spoke within said attaching means, said block being moulded with holes for the spokes extending through it and having rubber cushioning plugs fitting in the outer ends of the holes and vulcanised into the block against which plugs the ends of the spoke wires are received.

8. A steering wheel comprising in combination a rim, a number of arms or spokes built up of a number of resilient metal members, an attachment boss for the wheel in which the spoke members are anchored by casting said boss on to the ends of said members while they are held in the desired spaced relation, means for attaching the metal members of each spoke to the rim in a manner allowing end movement to them with respect to the rim when any displacement of the rim takes place, and resilient cushioning means resisting said end movement of the metal members, said cushioning means being formed by a rubber block having holes therein to receive the metal members and rubber plugs in said holes abutting the ends of the members to cushion endwise movement thereof.

9. A steering wheel having a rim, an attachment boss and a number of spokes each built up of a number of resilient metal members which are anchored at their inner ends in the boss, the member nearest the center of the spoke group being longer than the others of the group, and means for attaching the resilient metal members to the rim in a manner allowing for their movement endwise of the spoke, said means comprising a metal socket for each spoke containing a block of rubber having bores for said members and means for cushioning such movement.

10. A steering wheel having a rim, a central attachment boss, a number of spokes built up of a number of resilient wires anchored in the boss, and means for attaching the resilient wires to the rim so as to allow them end movement with respect to the rim; said means comprising a metal sleeve for each spoke let into the rim and secured therein, each sleeve receiving a rubber block in which the end of the resilient wires of the spoke are fitted, the end movement of the wires being opposed by a resilient cushion in said block.

11. A steering wheel having a rim, a central attachment boss, a number of spokes built up of a number of resilient wires anchored by casting the said boss on to the ends of said members while they are held in the desired spaced relation, and means for attaching the resilient wires to the rim so as to allow them end movement with respect to the rim; said means comprising a metal sleeve for each spoke let into the rim and secured therein, each sleeve receiving a rubber block in which the end of the resilient wires of the spoke are fitted, the end movement of the wires being opposed by a resilient cushion in said block.

12. A steering wheel having a rim, a central attachment boss, a number of spokes built up of a number of resilient wires anchored in the boss, and means for attaching the resilient wires to the rim so as to allow them end movement with respect to the rim; said means comprising a metal sleeve for each spoke let into the rim and secured therein, each sleeve receiving a rubber block in which the end of the resilient wires of the spoke are fitted, the end movement of the wires being opposed by resilient rubber plugs vulcanised in the rubber block.

13. A steering wheel having a rim, an attachment boss, a number of spokes built up of resilient wires anchored in the boss, a metal sleeve secured in the rim at each point where the resilient wires of the spokes are to be attached, said sleeve having a rubber block fitted within it and said block receiving in holes within it all the wires of a spoke and allowing to each end movement within the metal sleeve and also slight movement in any direction against the cushioning action of the block.

14. A steering wheel having a rim, an attachment boss and a number of spokes each built up of a number of resilient metal members which are anchored at their inner ends in the boss, the member nearest the centre of the spoke group being longer than the others of the group; means for attaching the resilient metal members to the rim in a manner allowing for their movement endwise of the spoke and means for cushioning such movement.

15. A steering wheel having a rim, an attachment boss and a number of spokes each built up of a number of resilient metal members which are anchored at their inner ends in the boss, the member nearest the centre of the spoke group being longer than the others of the group; means for attaching the resilient metal members to the rim in a manner allowing for their movement endwise of the spoke and means for cushioning such movement, the cushioning means allowing greater amplitude of endwise movement to the shorter members of each spoke group.

FRANK GEORGE WOOLLARD.